(12) United States Patent
Bandyopadhyay et al.

(10) Patent No.: US 9,644,528 B2
(45) Date of Patent: May 9, 2017

(54) ENGINE SYSTEM WITH EGR OVER-PRESSURE PROTECTION

(71) Applicant: Electro-Motive Diesel, Inc., LaGrange, IL (US)

(72) Inventors: Deep Bandyopadhyay, Naperville, IL (US); Keith E. Moravec, Downers Grove, IL (US); Michael B. Goetzke, Orland Park, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 258 days.

(21) Appl. No.: 14/146,293

(22) Filed: Jan. 2, 2014

(65) Prior Publication Data

US 2014/0208742 A1  Jul. 31, 2014

Related U.S. Application Data

(63) Continuation-in-part of application No. 13/756,123, filed on Jan. 31, 2013, now Pat. No. 8,931,256.

(51) Int. Cl.
*F02M 25/07* (2006.01)
*F02B 29/04* (2006.01)
(Continued)

(52) U.S. Cl.
CPC ........ *F02B 29/0412* (2013.01); *F02B 37/001* (2013.01); *F02B 37/004* (2013.01);
(Continued)

(58) Field of Classification Search
CPC .............. F02M 25/07; F02M 25/0703; F02M 25/0704; F02M 25/0711; F02M 25/0715;
(Continued)

(56) References Cited

U.S. PATENT DOCUMENTS 5,517,976 A   5/1996 Bächle et al.
5,671,600 A   9/1997 Pischinger et al.
(Continued)

FOREIGN PATENT DOCUMENTS

DE    197 17 846    11/1998
EP    1072765       6/2010
(Continued)

OTHER PUBLICATIONS

Dr. Johannes Kech et al., "Exhaust Gas Recirculation: Internal Engine Technology for Reducing Nitrogen Oxide Emissions", Engine Technology, MTU Friedrichshafen GmbH, www.mtu-online.com (Aug. 2011).

(Continued)

*Primary Examiner* — Jacob Amick
(74) *Attorney, Agent, or Firm* — Finnegan, Henderson, Farabow, Garrett & Dunner, LLP

(57) ABSTRACT

An engine system is disclosed for use with an engine having at least a first cylinder and a second cylinder. The engine system may have a first exhaust manifold fluidly connected to the first cylinder, a second exhaust manifold fluidly connected to the second cylinder, and a recirculation passage extending from the first exhaust manifold to at least one of the first and second cylinders. The engine system may also have a restricted orifice connecting the first exhaust manifold to the second exhaust manifold, a pressure relief passage extending from the first exhaust manifold, and a valve disposed within the pressure relief passage and movable to selectively reduce a back pressure of the first exhaust manifold.

16 Claims, 7 Drawing Sheets

(51) Int. Cl.

| | | |
|---|---|---|
| *F02M 35/10* | (2006.01) | |
| *F02B 37/00* | (2006.01) | |
| *F02B 37/007* | (2006.01) | |
| *F02B 37/013* | (2006.01) | |
| *F02B 37/02* | (2006.01) | |
| *F02B 37/18* | (2006.01) | |
| *F02M 26/43* | (2016.01) | |
| *F02M 26/05* | (2016.01) | |
| *F02M 26/24* | (2016.01) | |
| *F02M 26/38* | (2016.01) | |
| *F02M 26/44* | (2016.01) | |
| *F02M 26/08* | (2016.01) | |
| *F02M 26/35* | (2016.01) | |

(52) U.S. Cl.
CPC .......... *F02B 37/007* (2013.01); *F02B 37/013* (2013.01); *F02B 37/02* (2013.01); *F02B 37/18* (2013.01); *F02M 26/05* (2016.02); *F02M 26/24* (2016.02); *F02M 26/38* (2016.02); *F02M 26/43* (2016.02); *F02M 26/44* (2016.02); *F02M 35/10045* (2013.01); *F02M 26/08* (2016.02); *F02M 26/35* (2016.02); *Y02T 10/144* (2013.01); *Y02T 10/146* (2013.01)

(58) Field of Classification Search
CPC ........ F02M 26/05; F02M 26/24; F02M 26/38; F02M 26/44; F02B 29/0412
See application file for complete search history.

(56) References Cited

U.S. PATENT DOCUMENTS

| | | | |
|---|---|---|---|
| 6,082,100 A | 7/2000 | Boegner et al. | |
| 6,102,016 A * | 8/2000 | Sitar ................... | F02M 25/0773 |
| | | | 123/568.23 |
| 6,945,235 B1 | 9/2005 | Bertilsson et al. | |
| 7,941,999 B2 | 5/2011 | Kasper et al. | |
| 2004/0194463 A1 | 10/2004 | Yanagisawa et al. | |
| 2007/0039314 A1 | 2/2007 | Mizuguchi | |
| 2008/0060624 A1 | 3/2008 | Grandas | |
| 2008/0216475 A1 * | 9/2008 | Kasper ............... | F02M 25/0707 |
| | | | 60/605.2 |
| 2010/0122530 A1 * | 5/2010 | French ................ | F01N 5/04 |
| | | | 60/602 |
| 2011/0253113 A1 | 10/2011 | Roth et al. | |
| 2012/0078492 A1 | 3/2012 | Freund et al. | |

FOREIGN PATENT DOCUMENTS

| | | |
|---|---|---|
| GB | 2 093 909 | 9/1982 |
| JP | 2007/23920 | 7/2005 |
| WO | WO 2010/116064 | 10/2010 |
| WO | WO 2012/069376 | 5/2012 |

OTHER PUBLICATIONS

U.S. Patent Application of Keith A. Moravec et al., entitled "Engine System for Increasing Available Turbocharger Energy" filed on Jan. 31, 2013.

U.S. Patent Application of Steven Dallas Johnson, entitled "Engine System Having Parallel EGR Coolers" filed on Jan. 31, 2013.

* cited by examiner

ENGINE SYSTEM WITH EGR OVER-PRESSURE PROTECTION

RELATED APPLICATIONS

This application is a continuation-in-part application of U.S. application Ser. No. 13/756,123, filed Jan. 31, 2013, the contents of which are expressly incorporated herein by reference.

TECHNICAL FIELD

The present disclosure relates generally to an engine system and, more particularly, to an engine system having EGR over-pressure protection.

BACKGROUND

Combustion engines burn a mixture of air and fuel, generating mechanical power and a flow of exhaust. Engine exhaust contains, among other things, unburnt fuel, particulate matter such as soot, and harmful gases such as nitrous oxide or carbon monoxide. Modern engines are required to meet stringent emissions standards, which require the engines to discharge reduced levels of nitrous oxide and soot into the atmosphere. To comply with these standards, some engines use exhaust gas recirculation (EGR) circuit to recirculate a portion of the exhaust produced by the engines back through combustion chambers of the engines, which is known to reduce undesirable emissions discharged to the atmosphere.

An exemplary turbocharged engine implementing exhaust gas recirculation is disclosed in a technical article titled "Engine Gas Recirculation: Internal engine technology for reducing nitrogen oxide emissions" by MTU Friedrichshafen GmbH that published in August of 2011 ("the technical article"). In particular, the technical article discloses an internal combustion engine having a plurality of cylinders arranged into two different banks. Both banks of cylinders are provided with compressed air from a three-turbocharger arrangement (i.e., a high-pressure turbocharger and parallel low-pressure turbochargers). One of the banks of cylinders discharges exhaust to the turbochargers, while the other bank is considered a donor bank and discharges exhaust for recirculation within the engine. A single EGR cooler is mounted to the top of the engine for cooling exhaust from the donor bank of cylinders before the exhaust is distributed to all cylinders for subsequent mixing with air and combustion. A first control valve is located upstream of the EGR cooler and used to control EGR flow rates, while a second control valve is located in a bypass. The second control valve is used to build backpressure that drives the EGR process and also used to selectively direct excess exhaust from the donor bank of cylinders to the turbochargers.

Although the exhaust system of the technical article may provide for reduced emissions in some applications, it may still be less than optimal. In particular, the first control valve may be unable to independently vary the exhaust flows recirculated to the two banks of cylinders, which could limit engine functionality in some applications. Further, the location of the first control valve upstream of the cooler may create an extreme environment for the control valve that can lead to excessive wear of the valve. In addition, using the second control valve too frequently to both generate back pressure that drives EGR and to relieve excess exhaust from the donor bank could overtax the second control valve and cause it to fail prematurely.

The engine system of the present disclosure solves one or more of the problems set forth above and/or other problems in the art.

SUMMARY

In one aspect, the present disclosure is directed to an engine system for an engine having at least a first cylinder and a second cylinder. The engine system may include a first exhaust manifold fluidly connected to the first cylinder, a second exhaust manifold fluidly connected to the second cylinder, and a recirculation passage extending from the first exhaust manifold to at least one of the first and second cylinders. The engine system may also include a restricted orifice connecting the first exhaust manifold to the second exhaust manifold, a pressure relief passage extending from the first exhaust manifold, and a valve disposed within the pressure relief passage and movable to selectively reduce a back pressure of the first exhaust manifold.

In another aspect, the present disclosure is directed to a method of operating an engine having a first cylinder and a second cylinder. The method may include directing air into the first cylinder and into the second cylinder, directing exhaust from the first cylinder into a first exhaust manifold, and directing exhaust from the second cylinder into a second exhaust manifold. The method may also include restricting a flow of exhaust from the first exhaust manifold into the second exhaust manifold, and directing exhaust from the first exhaust manifold to mix with air entering at least one of the first and second cylinders. The method may further include selectively relieving a pressure of exhaust in the first exhaust manifold.

DETAILED DESCRIPTION

Figure 1:
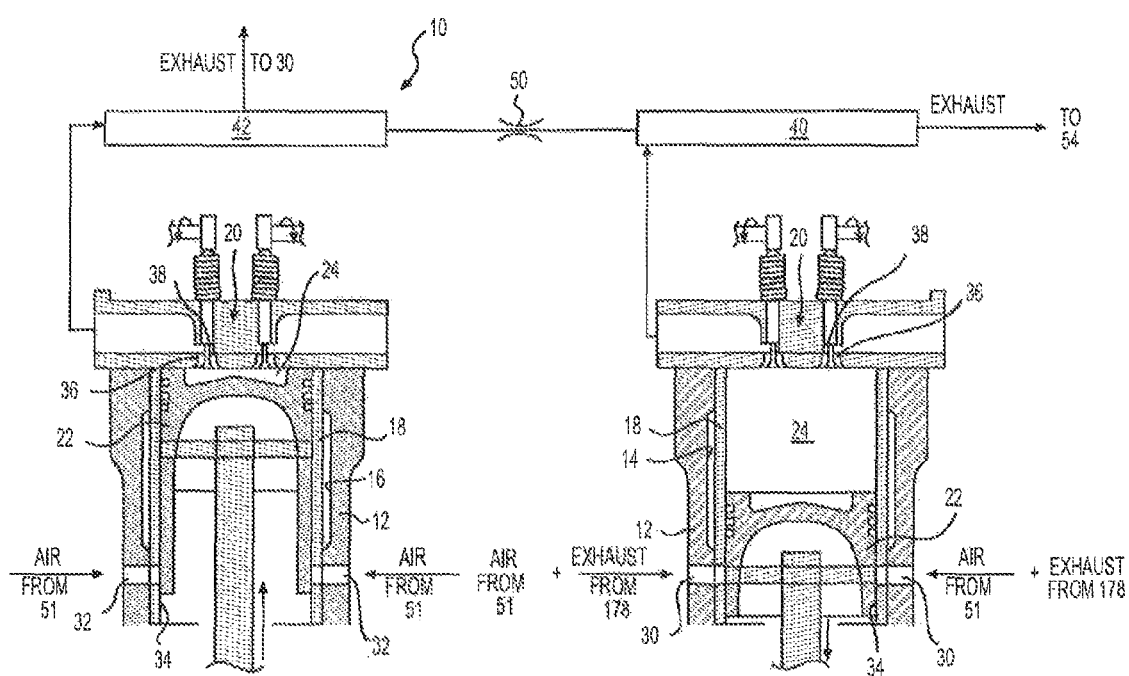
FIG. 1 is a cross-sectional illustration of an exemplary disclosed engine.

FIG. 1 illustrates a portion of an exemplary internal combustion engine 10. Although engine 10 is shown and described as a four-stroke diesel engine, it is contemplated that engine 10 may be another type of engine (e.g., a two-stroke diesel engine, a two- or four-stroke gasoline engine, or a two- or four-stroke gaseous fuel powered engine). Engine 10 may include, among other things, an engine block 12 having at least two cylinders 14, 16. Each of cylinders 14, 16 may include a cylinder liner 18 and a cylinder head 20 that are connected to engine block 12. A piston 22 may be slidably disposed within cylinder liner 18, and piston 22, together with cylinder liner 18 and cylinder head 20, may define a combustion chamber 24. Cylinder 14 may have the same or different dimensions and the same or different operating parameters compared to cylinder 16. It is contemplated that engine 10 may include any number of cylinders 14, 16 and that cylinders 14, 16 may be disposed in an "in-line" configuration, in a "V" configuration, in an opposing-piston configuration, or in any other suitable configuration.

Piston 22 may be configured to reciprocate within cylinder liner 18 between a top dead center (TDC) position and a bottom dead center (BDC) position. In particular, piston 22 may be pivotally connected to a crankshaft (not shown), which is rotatably disposed within engine block 12, so that a sliding motion of each piston 22 within cylinder liner 18 results in a rotation of the crankshaft. Similarly, a rotation of the crankshaft may result in a sliding motion of piston 22. As the crankshaft rotates through about 180°, piston 22 may move through one full stroke between BDC and TDC. As the crankshaft rotates through about 720°, engine 10 (as a four stroke engine) may undergo a complete combustion cycle that includes a power stroke, an exhaust stroke, an intake stroke and a compression stroke.

During the intake stroke, air may be drawn and/or forced into combustion chamber 24 via one or more intake ports 30, 32 located within an annular surface 34 of cylinder liner 18. In particular, as piston 22 moves downward within cylinder liner 18, a position will eventually be reached at which intake ports 30, 32 are no longer blocked by piston 22 and instead are fluidly communicated with combustion chamber 24. When intake ports 30, 32 are in fluid communication with combustion chamber 24 and a pressure of air at intake ports 30, 32 is greater than a pressure within combustion chamber 24, air will pass through intake ports 30, 32 into combustion chamber 24. Fuel may be mixed with the air before, during, and/or after the air enters combustion chamber 24. It is contemplated that intake ports 30, 32 could be located elsewhere, if desired (e.g., within cylinder head 15).

During the beginning of the compression stroke described above, air may still be entering combustion chamber 24 via intake ports 30, 32 as piston 22 starts its upward stroke to mix any residual gas with air (and fuel, if present) in combustion chamber 24. Eventually, intake ports 30, 32 may be blocked by piston 22, and further upward motion of piston 22 may compress the mixture. As the mixture within combustion chamber 24 is compressed, the mixture will increase in pressure and temperature until it combusts and releases chemical energy. This may result in a further and significant increase in the pressure and temperature within combustion chamber 24.

After piston 22 reaches TDC, the increased pressure caused by combustion may force piston 22 downward, thereby imparting mechanical power to the crankshaft. During a return of piston 22 (i.e., during the ensuing upward movement of the exhaust stroke), one or more exhaust valves 38 located within cylinder head 20 may open to allow pressurized exhaust within combustion chamber 24 to exit into associated exhaust manifolds 40 and 42. In particular, as piston 22 moves upward within cylinder liner 18, a position will eventually be reached at which exhaust valves 38 move to fluidly communicate combustion chamber 24 with exhaust ports 36. When combustion chamber 24 is in fluid communication with exhaust ports 36 and a pressure in combustion chamber 24 is greater than a pressure at exhaust ports 36, exhaust will pass from combustion chamber 24 through exhaust ports 36 into a corresponding one of exhaust manifolds 40, 42. In the disclosed embodiment, movement of exhaust valves 38 may be cyclically controlled, for example by way of a cam (not shown) or other device that is mechanically connected to the crankshaft. It is contemplated, however, that movement of exhaust valves 38 may alternatively be controlled in a non-cyclical manner, if desired. It is also contemplated that exhaust ports 36 could alternatively be located within cylinder liner 18, with their openings and closings dictated by the motion of piston 22 (i.e., exhaust valves 38 would be omitted), such as in a loop-scavenged two-cycle engine. Although operation of a four-stroke engine 10 has been described with reference to FIG. 1, one skilled in the art would understand that fuel may be combusted and exhaust may be generated in a similar manner in a two-stroke engine 10.

As illustrated in FIG. 1, exhaust from cylinder 14 may pass into first exhaust manifold 40, while exhaust from cylinder 16 may separately pass into second exhaust manifold 42. To help reduce harmful emissions, exhaust from second exhaust manifold 42 may be mixed with fresh air and reintroduced through intake ports 30 of cylinder 14 for combustion through a second cycle. Some exhaust may also pass from second exhaust manifold 42 through an orifice (e.g., a fixed orifice) 50 into first exhaust manifold 40. Exhaust in first exhaust manifold 40, including exhaust received from second exhaust manifold 42 and exhaust received from cylinder 14, may be discharged to the atmosphere. Cylinder 16, which donates exhaust for recirculation, will be referred to as a donor cylinder 16 in this disclosure. Cylinder 14, in contrast, will be referred to as a non-donor cylinder 14 in this disclosure. Exhaust from a non-donor cylinder 14 may generally not be recirculated through either donor cylinders 16 or non-donor cylinders 14. Both non-donor and donor cylinders 14 may receive either fresh air only or a mixture of fresh air and recirculated exhaust, as desired.

Figure 2:
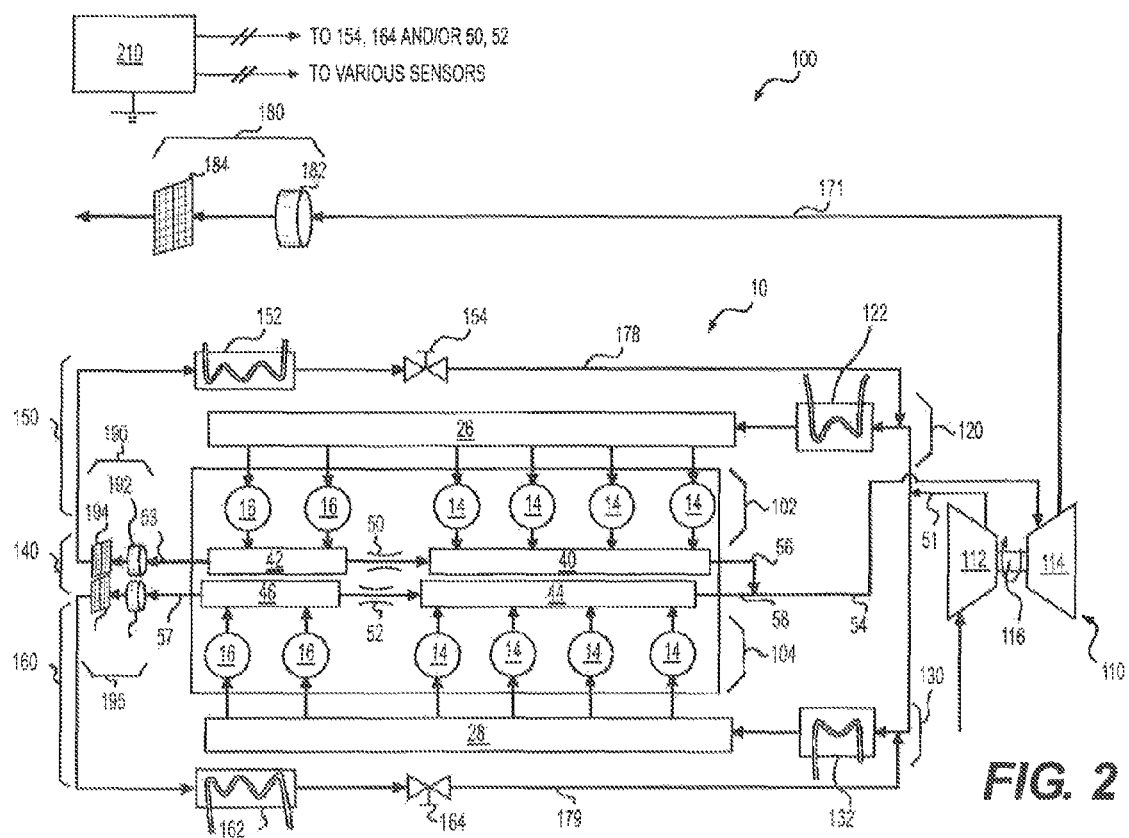
FIGS. 2-5 are diagrammatic illustrations of exemplary disclosed engine systems that may be used in conjunction with the engine of FIG. 1.

FIG. 2 illustrates an engine system 100, which may be used in conjunction with engine 10. As shown in FIG. 2, the cylinders of engine 10 may be arranged into a first bank 102 and a second bank 104. It is contemplated, however, that engine 10 may include any number of cylinder banks 102, 104. Each of first and second banks 102, 104 may include one or more non-donor cylinders 14 and one or more donor cylinders 16. It is also contemplated that first and/or second banks 102, 104 may alternatively each contain only non-donor cylinders 14 or only donor cylinders 16 (see FIG. 7), as desired.

Engine system 100 may include components configured to introduce air into non-donor and donor cylinders 14, 16, and to discharge to the atmosphere exhaust generated in the non-donor and donor cylinders 14, 16. For example, engine system 100 may include a turbocharger 110, a first intake arrangement 120, a second intake arrangement 130, an exhaust arrangement 140, a first EGR circuit 150, a second EGR circuit 160, and a controller 210. One skilled in the art would understand that, for clarity, FIG. 2 illustrates only some of the components of engine system 100 and that engine system 100 may include many additional components.

Turbocharger 110 may include a compressor 112, which may compress air and direct the compressed air via a passage 51 into a first intake manifold 26 and into a second intake manifold 28 through a first aftercooler 122 and a second aftercooler 132, respectively. Compressor 112 may be driven by a turbine 114, which may be propelled by exhaust flowing out of exhaust arrangement 140 through a passage 54. Exhaust may exit turbine 114 and be discharged to the atmosphere via a passage 171. Compressor 112 may embody a fixed geometry compressor, a variable geometry compressor, or any other type of compressor configured to draw air from the atmosphere and compress the air to a predetermined level before the air enters engine 10. Turbine 114 may be directly and mechanically connected to compressor 112 by way of a shaft 116 to form turbocharger 110. As hot exhaust gases exiting exhaust arrangement 140 move through and expand in turbine 114, turbine 114 may rotate and drive compressor 112 to pressurize inlet air. Although only one turbocharger 110 is depicted in FIG. 2, it is contemplated that engine system 100 may include any number of turbochargers 110. Moreover, each turbocharger 110 may include any number of compressors 112 and turbines 114.

First intake arrangement 120 may include first intake manifold 26 and first aftercooler 122. First aftercooler 122 may receive compressed air from compressor 112, cool the compressed air, and direct the cool compressed air into first intake manifold 26. First intake manifold 26 may, in turn, direct the air to non-donor and donor cylinders 14, 16 of first bank 102. Similarly, second intake arrangement 130 may include second intake manifold 28 and second aftercooler 132. Second intake arrangement 130 may function in a manner similar to that of first intake arrangement 120, with respect to second bank 104. Although FIG. 2 depicts two intake arrangements 120, 130, it is contemplated that air may be introduced into non-donor and donor cylinders 14, 16 via any number of intake arrangements.

Exhaust arrangement 140 may include first exhaust manifold 40, second exhaust manifold 42, a third exhaust manifold 44, a fourth exhaust manifold 46, first orifice 50, and a second orifice 52. First exhaust manifold 40 may receive exhaust generated by one or more non-donor cylinders 14 of first cylinder bank 102, while second exhaust manifold 42 may receive exhaust generated by one or more donor cylinders 16 of first cylinder bank 102. Third exhaust manifold 44 may receive exhaust generated by one or more non-donor cylinders 14 of second cylinder bank 104, while fourth exhaust manifold 46 may receive exhaust generated by one or more donor cylinders 16 of second cylinder bank 104. First orifice 50 may restrict a flow of exhaust between second exhaust manifold 42 and first exhaust manifold 40, while second orifice 52 may restrict a flow of exhaust between fourth exhaust manifold 46 and third exhaust manifold 44. The flow restrictions caused by first and second orifices 50, 52 may result in an increased pressure (commonly referred to as back pressure) within second exhaust manifold 42 and fourth exhaust manifold 46, respectively. This back pressure may function to drive a desired amount of exhaust into first and second EGR circuits 150 and 160. Despite the back pressure, some exhaust may still travel from second exhaust manifold 42 through first orifice 50 into first exhaust manifold 40, and some exhaust may still travel from fourth exhaust manifold 46 through second orifice 52 into third exhaust manifold 44.

Although two separate exhaust manifolds (i.e., 40 and 44) associated with non-donor cylinders 14 have been described above, it is contemplated that first and third exhaust manifolds 40, 44 may be replaced by a single exhaust manifold (see FIG. 7) that receives exhaust from all non-donor cylinders 14. Similarly, it is contemplated that second and fourth exhaust manifolds 42, 46 may be replaced by a single exhaust manifold (see FIG. 7) associated with all donor cylinders 16. It is also contemplated that, in some exemplary embodiments, there may be more than two exhaust manifolds associated with non-donor cylinders 14 and/or with donor cylinders 16. Further, the exhaust manifolds associated with donor cylinders 16 may be connected with exhaust manifolds associated with non-donor cylinders 14 by one or more orifices 50, 52.

First EGR circuit 150 may include a first EGR cooler 152 and a first control valve 154. First control valve 154 may regulate a flow of exhaust from first EGR cooler 152 through a passage 178 into first intake manifold 26. First EGR cooler 152 may cool the exhaust, which may then mix with fresh air supplied by compressor 112. The mixture of air and exhaust may be further cooled by first aftercooler 122 before entering first intake manifold 26. The cooled mixture may enter first intake manifold 26 and then be distributed into non-donor and donor cylinders 14, 16 of first bank 102. Some exhaust may simultaneously pass from second exhaust manifold 42 through first orifice 50 into first exhaust manifold 40.

Second EGR circuit 160 may include a second EGR cooler 162 and a second control valve 164. Second control valve 164 may regulate the flow of exhaust from second EGR cooler 162 through a passage 179 into second intake manifold 28. Like first EGR cooler 152, second EGR cooler 162 may cool the exhaust, which may then mix with fresh air supplied by compressor 112. The mixture of air and exhaust may be further cooled by second aftercooler 132 before entering second intake manifold 28. The cooled mixture may enter second intake manifold 28 and then be distributed to non-donor and donor cylinders 14, 16 of second bank 104. Some exhaust may simultaneously pass from fourth exhaust manifold 46 through second orifice 52 to third exhaust manifold 44. Although FIG. 2 depicts first and second control valves 154, 164 being located downstream of first and second EGR coolers 152, 162, respectively, it is contemplated that first and second control valves 154, 164 may be located anywhere in first and second EGR circuits 150, 160. It is also contemplated that first and second EGR circuits 150, 160 may include any number of control valves.

First and second EGR coolers 152, 162 may be configured to cool exhaust flowing through first and second EGR circuits 150, 160, respectively. First and second EGR coolers 152, 162 may include an air-to-liquid heat exchanger, an air-to-air heat exchanger, or any other type of heat exchanger known in the art for cooling an exhaust flow. Similarly, first and second aftercoolers 122, 132 may include an air-to-liquid heat exchanger, an air-to-air heat exchanger, or any other type of heat exchanger known in the art for cooling an exhaust flow or compressor discharge.

First control valve 154 may be a two-position or proportional type valve having a valve element movable to regulate a flow of exhaust through passage 178. The valve element in first control valve 154 may be hydraulic or pneumatic, and solenoid-operable to move between a flow-passing position and a flow-blocking position. It is contemplated that the valve element in first control valve 154 may be operable in any other manner known in the art. In the flow-passing position, first control valve 154 may permit exhaust to flow through passage 178 substantially unrestricted by first control valve 154. In contrast, in the flow-blocking position, first control valve 154 may restrict or completely block exhaust from flowing through passage 178. Second control valve 164 may regulate a flow of exhaust through passage 179 and may have a structure and method of operation similar to that of first control valve 154.

Exhaust from first and third exhaust manifolds 40, 44 may merge into passage 54, which may direct the exhaust into turbine 114. Passage 171 may direct exhaust from turbine 114 to the atmosphere. One or more aftertreatment components 180 may be disposed in passage 171 to treat the exhaust before discharge into the atmosphere. Aftertreatment component 180, in the disclosed example, includes a diesel oxidation catalyst (DOC) 182 and a diesel particulate filter (DPF) 184. DOC 182 may be located upstream from DPF 184. DPF 184 may trap soot in the exhaust flowing in passage 171. When DOC 182 reaches an activation temperature, nitrous oxide flowing through passage 171 may interact with the soot trapped in DPF 184 to oxidize some or all of the soot. One skilled in the art would recognize that exhaust from first and third exhaust manifolds 40, 44 may be supplied to one or more turbines 114 via one or more passages 56, 58. One skilled in the art would also recognize that more than one DOC 182 and/or DPF 184 may be employed by engine system 100 to treat the exhaust in passage 171. Further, one skilled in the art would recognize that any other type of aftertreatment device known in the art may be employed by engine system 100 in addition to or as an alternative to aftertreatment component 180.

DOC 182 may include a flow-through substrate having, for example, a honeycomb or other equivalent structure with channels for exhaust to flow through. The structure of the substrate may increase a contact area of DOC 182, allowing more exhaust constituents to be oxidized as they pass therethrough. A catalytic coating (for example, of a platinum group metal coating) may be applied to surfaces of the substrate to promote oxidation of particular constituents (e.g., hydrocarbons, carbon monoxide, oxides of nitrogen, etc.) of the exhaust as it flows through DOC 182.

DPF 184 may be a device used to physically separate soot or particulate matter from an exhaust flow. DPF 184 may include, for example, a wall-flow substrate. Exhaust may pass through walls of DPF 184, leaving larger particulate matter accumulated on the walls. It is contemplated that DPF 184 may be a filter having a wire mesh screen, a porous ceramic structure, or other configuration suitable for trapping soot particles. As is known in the art, DPF 184 may be periodically regenerated to clear the accumulated particulate matter. Additionally or alternatively, DPF 184 may be removed from engine system 100 and cleaned or replaced during routine maintenance.

A first aftertreatment component 190 may be disposed in passage 53 to treat exhaust flowing from second exhaust manifold 42 into first EGR circuit 150, and a second aftertreatment component 195 may be disposed in passage 57 to treat exhaust flowing from fourth exhaust manifold 46 into second EGR circuit 160. First aftertreatment component 190 may include a DOC 192 and a DPF 194, while second aftertreatment component 195 may include a DOC 196 and a DPF 198. DOC 192 may be located upstream from DPF 194, and DOC 196 may be located upstream from DPF 198. DOCs 192, 196 may function in a manner similar to DOC 182. Likewise, DPFs 194, 198 may function in a manner similar to DPF 184. One skilled in the art would recognize that one or more of first and second aftertreatment components 190, 195 may be disposed in one or more of passages 53, 57. Further, one skilled in the art would recognize that any other types of aftertreatment devices known in the art may be employed by engine system 100 in addition to or as an alternative to first and/or second aftertreatment components 190, 195.

Controller 210 may be configured to control operations of engine system 100 based on operational conditions of engine 10. In particular, controller 210 may receive data indicative of the operational conditions of engines 10, for example an actual flow rate, temperature, pressure, and/or constituency of exhaust within first, second, third, and fourth exhaust manifolds 40, 42, 44, 46 and/or first and second EGR circuits 150, 160. Such data may be received from another controller or computer (not shown), from sensors (not shown) strategically located throughout engine system 100, and/or from a user of engine 10. Controller 210 may then utilize stored algorithms, equations, subroutines, look-up maps and/or tables to analyze the operational condition data and determine a corresponding desired flow rate and/or constituency of exhaust within passage 171 that sufficiently reduces generation of regulated pollutants discharged to the atmosphere. Based on the desired flow rate and/or constituency, controller 210 may then cause first and second control valves 154, 164 to be adjusted such that desired amounts of exhaust may be recirculated by first and second EGR circuits 150, 160 back into first and second intake manifolds 26, 28. It is contemplated that the amount of exhaust that passes through first EGR circuit 150 may be controlled to be greater than, less than, or about equal to the amount of exhaust that passes through second EGR circuit 160.

Controller 210 may also be configured to selectively adjust operating parameters of donor cylinders 16 to regulate particular exhaust constituents generated by donor cylinders 16. For example, controller 210 may control operating parameters for donor cylinders 16, such that a ratio of a gaseous constituent-to-soot in the exhaust is about equal to a predetermined value. In one exemplary embodiment, the gaseous constituent is nitrous oxide and the predetermined value is about 3:1.

Controller 210 may also help ensure that regeneration of DPF 194 takes place at a desired interval through control of or donor cylinders 16. That is, controller 210 may help ensure that an amount of nitrous oxide (i.e., the desired ratio) is available at a desired time sufficient to oxidize the soot trapped in DPF 194. It is contemplated that oxidation of the soot (i.e., regeneration of DPF 194) may be passively and/or actively implemented. Passive regeneration, as used in this disclosure, refers to the process by which soot is oxidized in DOC 192 as exhaust including the desired ratio of nitrous oxide flows through passage 53, without the need for injecting hydrocarbons to trigger the oxidation. It is contemplated, however, that active regeneration (the injecting of hydrocarbons or other means to artificially raise exhaust temperatures and thereby trigger oxidation) may alternatively or additionally be utilized, if desired. Regeneration of DPF 194 may help reduce or eliminate the need to remove DPF 194 for cleaning, thus reducing the time during which engine 10 is not available for use and consequently reducing the expense associated with performing such maintenance on DPF 194.

Controller 210 may similarly regulate operating parameters of non-donor cylinders 14 to help ensure that the amount of harmful emissions, such as nitrous oxide and soot produced by non-donor cylinders 14, is reduced. In one exemplary embodiment, the operating parameters may include an injection timing, which may be measured as the time before or after TDC at which fuel is injected into the non-donor cylinders 14. In another exemplary embodiment, the operating parameters may include an intake timing or the time at which intake ports 30 are unblocked and ready to allow air to enter combustion chamber 24.

Controller 210 may embody a single or multiple microprocessors, digital signal processors (DSPs), etc. that include means for controlling an operation of engine system 100 and engine 10. Numerous commercially available microprocessors can be configured to perform the functions of controller 210. It should be appreciated that controller 210 could readily embody a microprocessor separate from that controlling other machine-related functions, or that controller 210 could be integral with a machine microprocessor and be capable of controlling numerous machine functions and modes of operation. If separate from the general machine microprocessor, controller 210 may communicate with the general machine microprocessor via datalinks or other methods. Various other known circuits may be associated with controller 210, including power supply circuitry, signal-conditioning circuitry, actuator driver circuitry (i.e., circuitry powering solenoids, motors, or piezo actuators), and communication circuitry.

Figure 3:
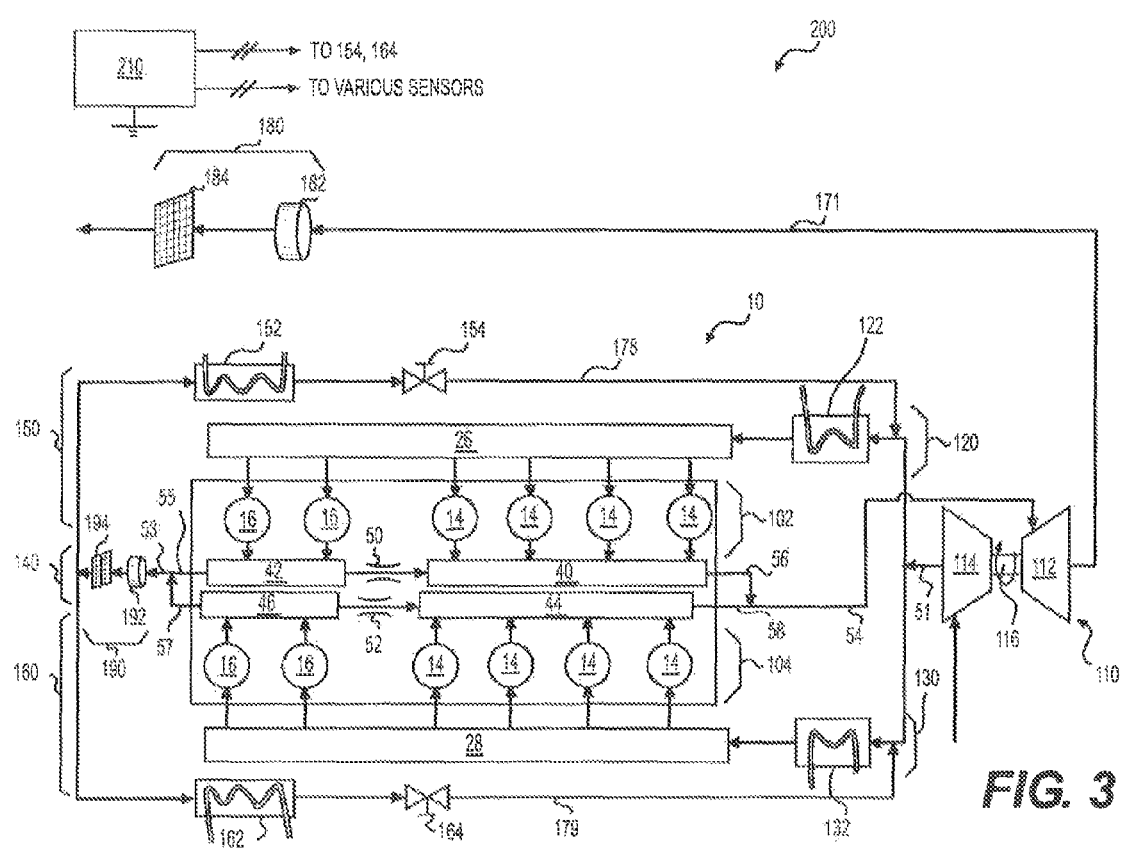

FIG. 3 illustrates an alternative engine system 200, which may be used in conjunction with engine 10 of FIG. 1. Many of the components of engine system 200 are similar to those already described with reference to engine system 100. In the following disclosure, only those components different from engine system 100 are described.

As shown in FIG. 3, exhaust from second and fourth exhaust manifolds 42 and 46 may merge into passage 53 and flow to first and second EGR circuits 150 and 160. As further illustrated in FIG. 3, exhaust from passages 55 and 57 may be treated using one or more aftertreatment components 190, which may be disposed in passage 53. It is also contemplated that one or more first and second aftertreatment components 190 and 195 may be used to treat exhaust in passages 55 and 57, respectively, before exhaust from passages 55 and 57 flows into passage 53.

Figure 4:
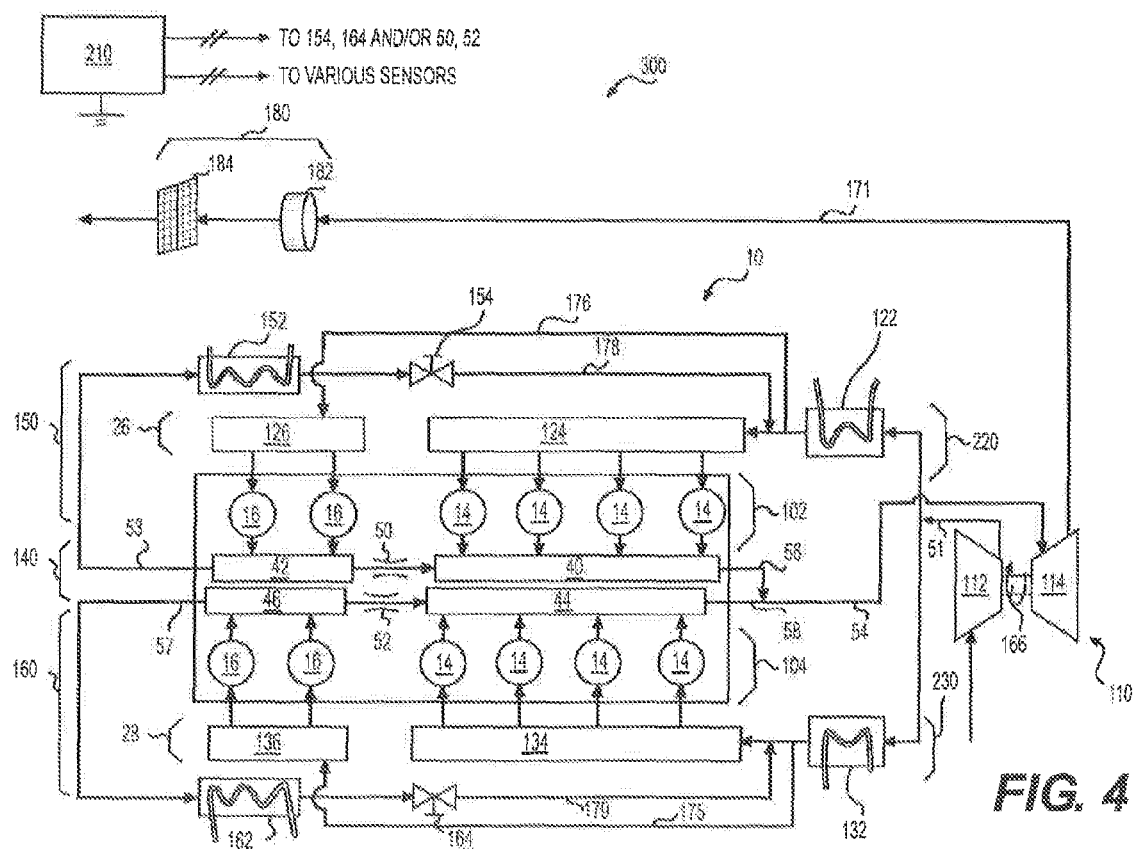

FIG. 4 illustrates another exemplary engine system 300, which may be used in conjunction with engine 10 of FIG. 1. Many of the components of engine system 300 are similar to those already described with reference to engine system 100. In the following disclosure, only those components different from engine system 100 are described.

As shown in FIG. 4, a first intake arrangement 220 may include first aftercooler 122, a first manifold section 124 and a second manifold section 126. First manifold section 124 may receive a mixture of cool air from first aftercooler 122 and exhaust from first EGR circuit 150, and direct the mixture to the one or more non-donor cylinders 14 in first cylinder bank 102. One skilled in the art would understand that additional components, such as orifices or control valves, may be incorporated between first aftercooler 122 and first manifold section 124 to help ensure that exhaust from passage 178 does not enter first aftercooler 122 or passage 176. Second manifold section 126 may receive cool air exiting first aftercooler 122 via passage 176, and direct the cool air to one or more donor cylinders 16 in first cylinder bank 102. Thus, in engine system 300, unlike engine system 100, donor cylinders 16 in first cylinder bank 102 may receive only fresh air, whereas non-donor cylinders 14 may receive a mixture of fresh air and exhaust recirculated by first EGR circuit 150.

Second cylinder bank 104 may function in a manner similar to that of first cylinder bank 102. Engine system 300 may include a second intake arrangement 230 having second aftercooler 132, a third manifold section 134 and a fourth manifold section 136. Like first manifold section 124, third manifold section 134 may direct a mixture of fresh air and exhaust from second EGR circuit 160 to non-donor cylinders 14 in second cylinder bank 104. Again, one skilled in the art would understand that additional components, such as orifices or control valves, may be incorporated between second aftercooler 132 and third manifold section 134 to help ensure that exhaust from passage 179 does not enter second aftercooler 132 or passage 175. Like second manifold section 126, fourth manifold section 136 may direct only fresh air received via passage 175 to donor cylinders 16 in second cylinder bank 104.

As FIG. 4 also illustrates, in engine system 300, the exhaust in first and second EGR circuits 150 and 160 may not pass through first and second aftercoolers 122 and 132, respectively. Instead, the exhaust may mix with cooled air exiting from first and second aftercoolers 122 and 132, respectively. As a result, there may be no need to treat the exhaust flowing through first and second EGR circuits 150 and 160 in engine system 300, and first and second aftertreatment components 190, 195 may be omitted from engine system 300. It is contemplated, however, that engine system 300 may still include first and second aftertreatment components 190, 195, if desired. FIG. 4 depicts exhaust from second and fourth exhaust manifolds 42, 46 flowing separately through passages 53, 57 and into first and second EGR circuits 150 and 160, respectively. It is contemplated, however, that exhaust from second and fourth exhaust manifolds 42, 46 may merge and flow via a single passage into first and second EGR circuits 150 and 160, as depicted in FIG. 2, if desired.

Figure 5:
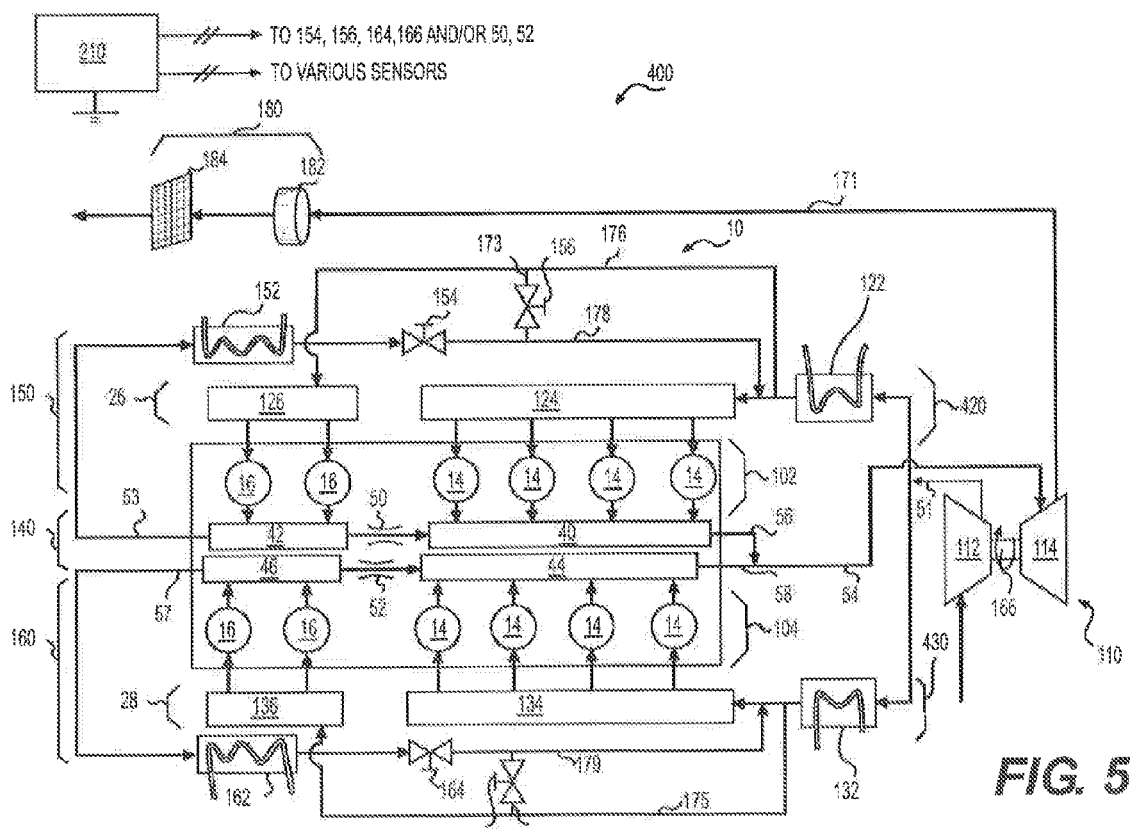

FIG. 5 illustrates another exemplary engine system 400, which may be used in conjunction with engine 10 of FIG. 1. Many of the components of engine system 400 are similar to those already described with reference to engine systems 100 and 300. In the following disclosure, only those components different from engine systems 100 and 300 are described.

As shown in FIG. 5, a first intake arrangement 420 may include a third control valve 156 disposed in a passage 173. Passage 173 may allow recirculated exhaust to flow from passage 178 into second manifold section 126 through passage 176. At this time, cool air from first aftercooler 122 may flow directly to first manifold section 124 and simultaneously pass through passage 176 into second manifold section 126. The recirculated exhaust may mix with the cool air in passage 176 and enter second manifold section 126 at a first concentration. The recirculated exhaust may also flow through passage 178 and mix with cool air entering first manifold section 124 at a second concentration. Thus, in engine system 400, unlike engine system 300, both donor cylinders 16 and non-donor cylinders 14 in first cylinder bank 102 may receive a mixture of fresh air and exhaust recirculated by first EGR circuit 150, and the amount of exhaust supplied to donor cylinders 16 may be the same or different from the amount of exhaust supplied to non-donor cylinders 14 in first cylinder bank 102. Thus, the first concentration of exhaust and the second concentration of exhaust may be the same or different. FIG. 5 depicts one exemplary arrangement, in which third control valve 156 diverts exhaust away from first manifold section 124 and toward second manifold section 126. One skilled in the art would recognize, however, that there may be other engine system configurations for directing different concentrations of exhaust to donor cylinders 16 and non-donor cylinders 14 in first cylinder bank 102.

Second cylinder bank 104 in engine system 400 may function in a manner similar to that of first cylinder bank 102 described above. Engine system 400 may include a second intake arrangement 430, which may include a fourth control valve 166 disposed in a passage 177. Passage 177 may allow exhaust to flow from passage 179 into fourth manifold section 136 through passage 175. Cool air from second aftercooler 132 may flow directly into third manifold section 134 and through passage 175 into fourth manifold section 136. The exhaust may mix with the cool air in passage 175 and enter fourth manifold section 136, which may supply the mixture to donor cylinders 16. Exhaust may flow through passage 179 and mix with the cool air entering third manifold section 134, which may then be supplied to non-donor cylinders 14. Thus, both donor cylinders 16 and non-donor cylinders 14 in second cylinder bank 104 of engine system 400 may receive a mixture of fresh air and exhaust recirculated by second EGR circuit 160. And unlike engine system 300, the exhaust supplied to donor cylinders 16 in engine system 400 may be the same or different amounts compared to the amount of exhaust supplied to non-donor cylinders 14 in second cylinder bank 104. FIG. 5 depicts one exemplary arrangement, in which fourth control valve 166 diverts exhaust from third manifold section 134 to fourth manifold section 136. One skilled in the art would recognize, however, that there may be other engine system configurations for directing exhaust to donor cylinders 16 and non-donor cylinders 14 in the second cylinder bank 104. Controller 210 may regulate third and fourth control valves 156, 166 to control the amount of exhaust supplied to donor cylinders 16 from first and second EGR circuits 150, 160, respectively.

FIG. 5 depicts exhaust from second and fourth exhaust manifolds 42, 46 flowing separately through passages 53, 57 into first and second EGR circuits 150 and 160, respectively. It is contemplated, however, that exhaust from second and fourth exhaust manifolds 42, 46 may alternatively first merge and then flow via a single passage into first and second EGR circuits 150 and 160, as depicted in FIG. 2, if desired. It is also contemplated that first and second intake arrangements 120, 130 in engine system 100 (FIG. 2) may be replaced with first and second intake arrangements 220, 230 (FIG. 4), respectively, or vice-versa. It is further contemplated that first and second intake arrangements 120, 130 in engine system 100 (FIG. 2) may be replaced with first and second intake arrangements 420, 430 (FIG. 5), respectively, or vice-versa.

Figure 6:
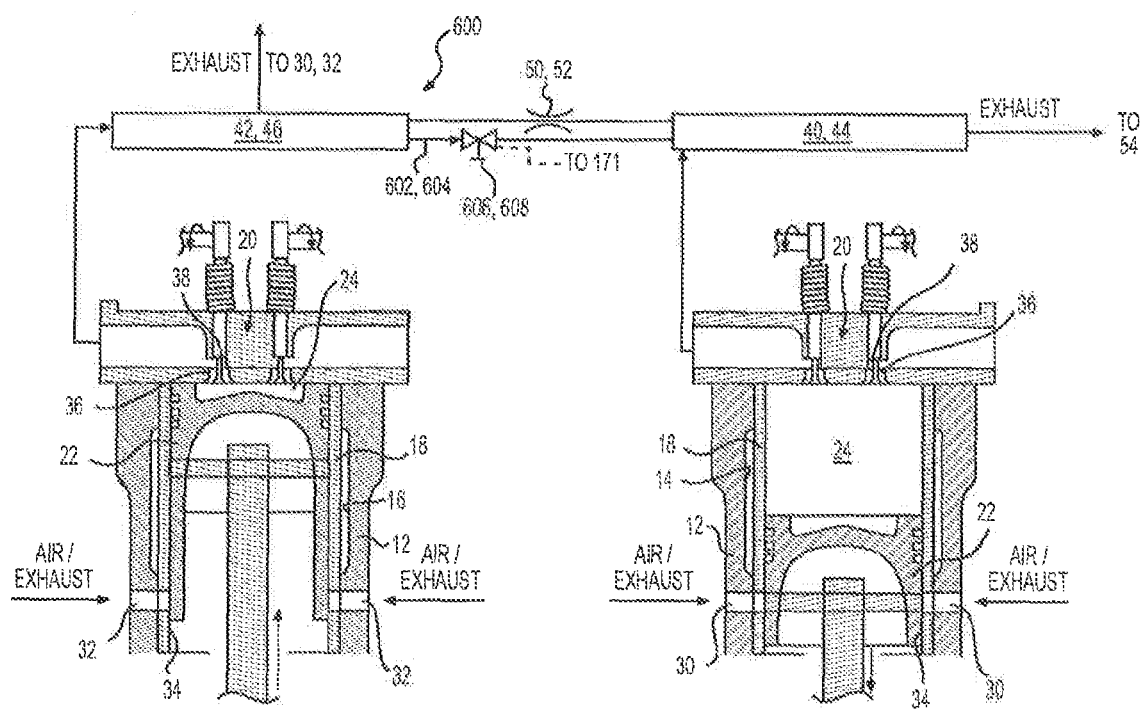
FIG. 6 is a cross-sectional illustration of another exemplary disclosed engine.

FIG. 6 illustrates an alternative engine 600. Similar to engine 10 of FIGS. 1-5, engine 600 of FIG. 6 may include non-donor and donor cylinders 14, 16 that receive air and/or a mixture of air and recirculated exhaust from any combination of intake manifolds 26, 28 and/or manifold sections 124, 126, 134, 136. The non-donor and donor cylinders 14, 16 of engine 600, just like the non-donor and donor cylinders 14, 16 of engine 10, may also discharge exhaust to any combination of exhaust manifolds 40-46. And like engine 10, exhaust manifolds 40, 44 of engine 600 may be connected to receive excess flow from exhaust manifolds 42, 46, respectively, via orifices 50, 52.

However, in contrast to engine 10 of FIGS. 1-5, engine 600 of FIG. 6 may include additional passages 602, 604 that connect exhaust manifolds 40, 44 with exhaust manifolds 42, 46, respectively, and additional valves 606, 608 disposed within passages 602, 604. In this configuration, valves 606, 608 may act as pressure-reducing valves that are used primarily during conditions of extremely elevated back pressures. In some embodiments, valves 606, 608 may only be used when pressures within exhaust manifolds 42, 46 near or exceed design limits of engine 600 (e.g., design limits of donor cylinders 16). For example, during conditions when the recirculation of exhaust gas back into non-donor and/or donor cylinders 14, 16 is undesired and control valves 154, 156, 164, and/or 177 are in associated flow-restricting or -blocking positions, the back pressures within exhaust manifolds 42 and/or 46 may rise (i.e., because donor cylinders 16 are still producing exhaust and the exhaust is not being relieved via EGR). Under these conditions, the fixed nature of orifices 50, 52 may allow too little exhaust to pass from exhaust manifolds 42, 46 to exhaust manifolds 40, 44. And in order to help maintain back pressures within exhaust manifolds 42, 46 below engine design limits, valves 606, 608 may be selectively opened to pass additional exhaust from exhaust manifolds 42, 46 to exhaust manifolds 40, 44 (e.g., in parallel with flow through orifices 50, 52), thereby relieving back pressures within exhaust manifolds 42, 46.

Valves 606, 608 may take any form necessary to appropriately relieve back pressures from exhaust manifolds 42, 46. In one example, valves 606, 608 are control valves, whose operation is regulated by controller 210. In particular, based on measured and/or predicted back pressure values within exhaust manifolds 42, 46, controller 210 may selectively cause valve 606 and/or valve 608 to open and pass excess exhaust to exhaust manifold 40 and/or 44. Alternatively, based on a known, controlled, and/or impending movement of control valves 154, 156, 164, and/or 177 used to reduce exhaust gas recirculation, valve 606 and/or valve 608 may be caused to automatically and simultaneously open a corresponding amount such that the back pressures within exhaust manifolds 42, 46 remain substantially unaffected by the closing movements of control valves 154, 156, 164, and/or 177. In yet another embodiment, valve 606 and/or valve 608 may be selectively opened based on a geographic location (e.g., when it is determined that engine 600 is at a location where EGR should be reduced, such as in a tunnel) or other similar parameter. In a final example, valves 606, 608 could be uncontrolled pressure-biased valves (e.g., reed valves) that are directly moved by pressures within exhaust manifolds 42, 46 reaching or exceeding threshold values.

In an alternative embodiment that is also shown in FIG. 6, in addition to or instead of relieving excess exhaust from exhaust manifolds 42, 46 to exhaust manifolds 40, 44 (shown in solid line), valves 606, 608 could be used to direct excess exhaust to other locations (represented by dashed lines stemming from valves 606, 608). For example, excess exhaust could be directed from exhaust manifolds 42, 46 through valves 606, 608, respectively, to a location downstream of turbine 114. In this configuration, excess exhaust that might otherwise cause overspeeding of turbine 114 may be controllably discharged to the atmosphere.

Figure 7:
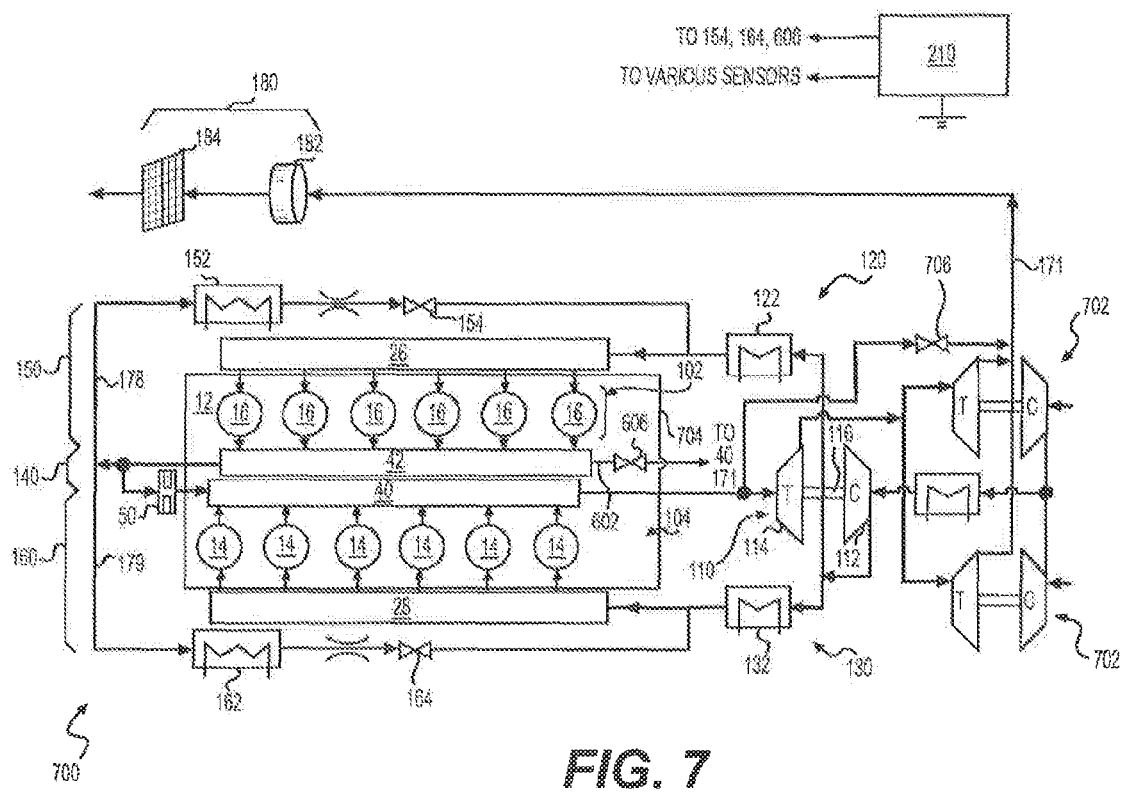
FIG. 7 is a diagrammatic illustration of an exemplary disclosed engine system that may be used in conjunction with the engine of FIG. 6.

FIG. 7 illustrates an alternative engine system 700 that may be used together with engine 600 of FIG. 6. Although engine system 700 has many of the same components as engine systems 100-400 (e.g., non-donor cylinders 14, donor cylinders 16, turbocharger 110, intake manifolds 26 and 28, exhaust manifolds 42 and 40, orifice 50, aftercoolers 122 and 132, EGR coolers 152 and 162, control valves 154 and 164, aftertreatment component 180, etc.) of FIGS. 2-5, the arrangement of these components is different in engine system 700. For example, in engine system 700, all non-donor cylinders 14 are located within a single bank 104, draw air from a single intake manifold 28, and discharge exhaust to a common manifold 44. Likewise, all donor cylinders 16 are located within a single bank 102, draw air from a single intake manifold 26, and discharge exhaust to a common manifold 42. In addition, turbocharger 110 is arranged as a high-pressure turbocharger located downstream of a pair of low-pressure turbochargers 702, and a bypass passage 704 having a wastegate 706 is utilized to selectively direct exhaust from exhaust manifold 40 around turbocharger 110 to discharge passage 171.

In the configuration of FIG. 7, valve 606 located within passage 602 is used in similar manner as described above with respect to FIG. 6. In particular, valve 606 may be used to selectively reduce back pressure within exhaust manifold 42 when an amount of exhaust gas recirculated to intake manifolds 26 and/or 28 is reduced. The excess exhaust passing through valve 606 may be directed to any one of a number of different locations within engine system 700, such as directly into exhaust manifold 40, to another location upstream of high-pressure turbocharger 110, to a location downstream of high-pressure turbocharger 110 but upstream of low-pressure turbochargers 702, to a location downstream of low-pressure turbochargers 702 (e.g., into passage 171), to a combination of these locations, or to another suitable location. As described above, valve 606 may be regulated by controller 210 or directly moved by a pressure of exhaust within manifold 42, as desired.

INDUSTRIAL APPLICABILITY

The disclosed engine systems may be used in any machine or power system application where it is beneficial to reduce emissions of harmful gases, while also delivering a desired power output from an associated engine. The disclosed engine system finds particular applicability within mobile machines, such as locomotives, which can be subjected to large variations in load and emissions requirements. The disclosed engine system may provide an improved method for reducing harmful emissions in the exhaust discharged to the atmosphere, while delivering adequate exhaust to the turbocharger to meet the power output demand from the engine at any load and protecting associated cylinders from elevated back pressures. Exemplary engine system operations will now be described.

During operation of engine system 100, air or a mixture of air and fuel may be pressurized by compressor 112, cooled by first and second aftercoolers 122, 132, and directed into non-donor and donor cylinders 14, 16 for subsequent combustion. Combustion of the air/fuel mixture may result in mechanical power being generated in the form of a rotating crankshaft. Byproducts of combustion, namely exhaust and heat, may flow from engine system 100 through turbine 114 to the atmosphere.

A portion of the exhaust and heat produced by engine system 100 may also be selectively recirculated from second and fourth exhaust manifolds 42 and 46 into air intake arrangements 120 and 130, respectively. This exhaust may flow from second exhaust manifold 42 through first EGR cooler 152 and first control valve 154 into passage 178. First EGR cooler 152 may cool the exhaust before the exhaust mixes with compressed air from compressor 112. The cooled and compressed mixture may be further cooled by first aftercooler 122 before entering non-donor cylinders 14 and donor cylinders 16, along with fuel, for subsequent combustion. The recirculation of exhaust may help dilute the mixture of fuel and air, and increase the thermal capacity within non-donor cylinders 14 and donor cylinders 16, resulting in a lower combustion temperature. As is known in the art, a lower combustion temperature may help to reduce a rate of nitrous oxide formed during combustion. Cooling the mixture of fresh air and exhaust via first aftercooler 122 may also help to reduce the rate of nitrous oxide formation during combustion.

During the intake stroke of piston 22, first intake manifold 26 may direct an intake charge into non-donor cylinder 14. The intake charge may include fresh air or a mixture of air and recirculated exhaust gas. Controller 210 may adjust a position of first control valve 154 to direct exhaust from second exhaust manifold 42 through first EGR circuit 150 to first intake manifold 26. At the same time first orifice 50 may permit a restricted flow of exhaust to pass from second exhaust manifold 42 to first exhaust manifold 40. Controller 210 may also communicate with sensors that measure an amount of nitrous oxide and/or soot in exhaust flowing in passage 171.

Controller 210 may adjust the position of first control valve 154 to selectively increase the amount of exhaust flowing from second exhaust manifold 42 to first intake manifold 26, to help ensure that the amount of nitrous oxide or soot in passage 171 remains below the permitted limits. When controller 210 adjusts first control valve 154 to a partially closed position, a pressure within second exhaust manifold 42 may increase. First orifice 50 may permit some exhaust to flow from second exhaust manifold 42 to first exhaust manifold 40 based on the pressure within second exhaust manifold 42. Controller may similarly adjust a position of second control valve 164 to control a exhaust flowing from fourth exhaust manifold 46 to second intake manifold 28. For example, when controller 210 adjusts second control valve 164 to a partially closed position, a pressure within fourth exhaust manifold 46 may increase. Second orifice 52 may permit some exhaust to flow from fourth exhaust manifold 46 to third exhaust manifold 44 based on the pressure within fourth exhaust manifold 46. Thus controller 210 may control first and second control valves 154 and 164 to help ensure that a sufficient amount of exhaust may be recirculated from the second and fourth exhaust manifolds 42, 46 to the first and second intake manifolds 26, 28, respectively, thereby helping to reduce the generation of harmful emissions. In addition, controller 210 may allow a sufficient amount of exhaust to pass through first and second orifices 50, 52 to help ensure that a desired amount of exhaust may be supplied to propel turbocharger 110, while still generating a desired amount of backpressure that drives the recirculated exhaust.

In some situations, the amount of recirculated exhaust gas passing from second and/or fourth exhaust manifolds 42, 46 back into first and/or second intake manifolds 26, 28, respectively, may be reduced. This reduction may be based on any number of different factors, including, for example, changing environmental conditions (e.g., driving through a tunnel), changing emissions regulations, changing engine operating conditions, etc. When the amount of recirculated exhaust gas reduces below a threshold amount, back pressure within the first and third exhaust manifolds may rise above levels that can be adequately relieved by first and second orifice 50, 52. At this time, controller 210 may need to selectively cause valves 606 and/or 608 to open and thereby reduce the back pressures to below design limits of engine 10.

Controller 210 may also communicate with sensors that measure an amount of nitrous oxide or other exhaust gases flowing out of second and fourth exhaust manifolds 42, 46. Controller may then responsively adjust operating parameters of donor cylinder 16 or non-donor cylinder 14, such that a ratio of nitrous oxide-to-soot is a desired value. By allowing a higher concentration of nitrous oxide, controller 210 may help ensure that a sufficient amount of nitrous oxide is available to DOC 192 to help promote oxidation of soot in DPF 194. By self-regenerating DPF 194 in this manner, controller 210 may allow engine system 100 to perform continuous operations without the need to shut down engine 10 for removal and cleaning of DPF 194.

Controller 210 may determine the operating parameters of non-donor and/or donor cylinders 14, 16 from one or more lookup tables stored in memory. The lookup tables may relate sensed data values to a load on engine 10. Additionally or alternatively, the data values may be related in the table to a speed of engine 10, which may be represented by, for example, a rate of rotation of the crankshaft in engine 10 or by a rate of travel of a machine (not shown) that includes engine 10.

Engine system 200 may operate in a manner similar to that of engine system 100. During an exemplary operation of engine system 200, controller 210 may regulate first control valve 154 to help deliver a desired amount of exhaust from donor cylinders 16 to non-donor cylinders 14 of first bank 102. In system 200, because passages 55 and 57 merge into passage 53, the amount of exhaust flowing through first EGR circuit 150 may come from one or both of second and fourth exhaust manifolds 42, 46. Controller 210 may similarly regulate second control valve 164 to help deliver exhaust from donor cylinders 16 to non-donor cylinders 14 of second bank 104. The exhaust flowing through second EGR circuit 160 may come from one or both of second and fourth exhaust manifolds 42, 46. And in situations where back pressure within second and/or fourth exhaust manifolds 42, 46 becomes excessive, controller 210 may open one or both of valves 606, 608 to selectively relieve the back pressure.

Engine system 300 may operate in a manner similar to that of engine system 100. During an exemplary operation of engine system 300, controller 210 may regulate first control valve 154 to help deliver a desired amount of exhaust from donor cylinders 16 to non-donor cylinders 14 within first bank 102. Controller 210 may similarly regulate second control valve 164 in associated with second cylinder bank 104. Because exhaust may be recirculated only through non-donor cylinders 14 in engine system 300, the amounts of exhaust recirculated through engine system 300 may be smaller than the amount of exhaust recirculated through engine system 100. By reducing the amount of exhaust recirculated through engine system 300, more exhaust may be available to propel turbocharger 110, thereby increasing turbocharger energy. And in situations where back pressure within second and/or fourth exhaust manifolds 42, 46 becomes excessive, controller 210 may open one or both of valves 606, 608 to selectively relieve the back pressure.

Engine system 400 may operate in a manner similar to that of engine system 300. During operation of engine system 400, controller 210 may regulate third control valve 156 to help deliver recirculated exhaust to donor cylinders 16 of first bank 102. The remaining recirculated exhaust flow may be delivered to non-donor cylinders 14 of first bank 102. Controller 210 may similarly regulate second control valve 164 in associated with the cylinders of second bank 104. And in situations where back pressure within second and/or fourth exhaust manifolds 42, 46 becomes excessive, controller 210 may open one or both of valves 606, 608 to selectively relieve the back pressure.

Engine system 700 may operate similar to engine systems 100-300. In particular, during operation of engine 10, controller 210 may regulate first and second control valves 154, 164 to help deliver recirculated exhaust to all cylinders 14, 16 of first and second banks 102, 104, respectively. The exhaust flowing through first and second EGR circuits 150, 160 may come from one and/or both of second and fourth exhaust manifolds 42, 46. And in situations where back pressure within second and/or fourth exhaust manifolds 42, 46 becomes excessive, controller 210 may open one or both of valves 606, 608 to selectively relieve the back pressure.

The disclosed engine systems may have several benefits. For example, because recirculated exhaust flows to the different banks of cylinders and to different cylinders within each bank may be independently varied, engine functionality may be enhanced. Further, the location of control valves 154, 156, 164, 166 downstream of EGR coolers 152, 162 may create cool operating environments for the valves that can lead to reduced valve wear. In addition, because valves 606 and 608 are primarily used only to relieve extreme back pressures, the valves may have prolonged lives.

It will be apparent to those skilled in the art that various modifications and variations can be made to the disclosed engine systems without departing from the scope of the disclosure. Other embodiments of the engine systems will be apparent to those skilled in the art from consideration of the specification and practice of the engine systems disclosed herein. It is intended that the specification and examples be considered as exemplary only, with a true scope of the disclosure being indicated by the following claims and their equivalents.

What is claimed is:

1. An engine system for an engine having at least a first cylinder, a second cylinder, a third cylinder, and a fourth cylinder, the engine system comprising:
    a first exhaust manifold fluidly connected to the first cylinder;
    a second exhaust manifold fluidly connected to the second cylinder;
    a third exhaust manifold fluidly connected to the third cylinder;
    a fourth exhaust manifold fluidly connected to the fourth cylinder, the fourth exhaust manifold being distinct from the third exhaust manifold;
    a recirculation passage extending from the first exhaust manifold to at least one of the first and second cylinders;
    a recirculation control valve disposed in the recirculation passage;
    a first restricted orifice connecting the first exhaust manifold to the second exhaust manifold;
    a second restricted orifice connecting the third exhaust manifold to the fourth exhaust manifold;
    a first pressure relief passage extending from the first exhaust manifold;
    a second pressure relief passage extending from the third exhaust manifold;
    a first valve disposed within the first pressure relief passage and movable to selectively reduce a back pressure of the first exhaust manifold, the first valve being a relief control valve configured to move between a flow-passing position and a flow-blocking position;
    a second valve disposed within the second pressure relief passage and movable to selectively reduce a back pressure of the third exhaust manifold; and
    a controller in communication with the relief control valve and the recirculation control valve, the controller being configured to effect an opening motion of the relief control valve automatically based on a closing motion of the recirculation control valve and simultaneously with the closing motion of the recirculation control valve.

2. The engine system of claim 1, wherein the recirculation passage extends from the first exhaust manifold to both of the first and second cylinders.

3. The engine system of claim 1, wherein the recirculation passage is a first recirculation passage,
    the engine system further comprising a second recirculation passage extending from the first exhaust manifold to at least one of the third and fourth cylinders.

4. The engine system of claim 3, further comprising
    a first intake manifold connecting the first and second cylinders; and
    a second intake manifold connecting the third and fourth cylinders, wherein the first recirculation passage is fluidly connected to the first intake manifold, and the second recirculation passage is fluidly connected to the second intake manifold.

5. The engine system of claim 1, wherein the recirculation passage is connected to the first and third exhaust manifolds in parallel.

6. The engine system of claim 1, further comprising a turbocharger connected downstream of the second exhaust manifold, wherein the first pressure relief passage extends from the first exhaust manifold to the turbocharger.

7. The engine system of claim 1, further comprising a turbocharger connected downstream of the second exhaust manifold, wherein the first pressure relief passage extends from the first exhaust manifold to a location downstream of the turbocharger.

8. The engine system of claim 1, further comprising:
a high-pressure turbocharger connected downstream of the second exhaust manifold; and
a low-pressure turbocharger connected downstream of the high-pressure turbocharger,
wherein the first pressure relief passage extends from the first exhaust manifold to a location downstream of the high-pressure turbocharger and upstream of the low-pressure turbocharger.

9. The engine system of claim 1, further comprising:
a high-pressure turbocharger connected downstream of the second exhaust manifold; and
a low-pressure turbocharger connected downstream of the high-pressure turbocharger,
wherein the first pressure relief passage extends from the first exhaust manifold to a location downstream of the low-pressure turbocharger.

10. The engine system of claim 1, wherein the first restricted orifice is a fixed orifice.

11. The engine system of claim 1, further comprising a cooler disposed in the recirculation passage, wherein the recirculation control valve is located downstream of the cooler.

12. The engine system of claim 1, wherein the controller is further configured to cause the relief control valve to move based on a pressure of exhaust in the first exhaust manifold.

13. A method for operating an engine having a first cylinder, a second cylinder, a third cylinder, and a fourth cylinder, the engine further including
a first exhaust manifold fluidly connected to the first cylinder;
a second exhaust manifold fluidly connected to the second cylinder;
a third exhaust manifold fluidly connected to the third cylinder;
a fourth exhaust manifold fluidly connected to the fourth cylinder, the fourth exhaust manifold being distinct from the third exhaust manifold;
a recirculation passage extending from the first exhaust manifold to at least one of the first and second cylinders;
a recirculation control valve disposed in the recirculation passage;
a first pressure relief passage extending from the first exhaust manifold;
a relief control valve disposed within the first pressure relief passage and movable to selectively reduce a back pressure of the first exhaust manifold, the relief control valve being configured to move between a flow-passing position and a flow-blocking position; and
a controller in communication with the recirculation control valve and the relief control valve,
the method comprising:
directing air into the first cylinder, the second cylinder, the third cylinder, and the fourth cylinder;
directing exhaust from the first cylinder into the first exhaust manifold;
directing exhaust from the second cylinder into the second exhaust manifold;
directing exhaust from the third cylinder into the third exhaust manifold;
directing exhaust from the fourth cylinder into the fourth exhaust manifold;
restricting a flow of exhaust from the first exhaust manifold into the second exhaust manifold;
restricting a flow of exhaust from the third exhaust manifold into the fourth exhaust manifold;
directing exhaust from the first exhaust manifold to mix with air entering at least one of the first and second cylinders by effecting an opening motion of the recirculation control valve via the controller;
directing exhaust from the third exhaust manifold to mix with air entering at least one of the third and fourth cylinders;
selectively relieving a pressure of exhaust in the first exhaust manifold by effecting an opening motion of the relief control valve via the controller, the controller being configured to effect the opening motion of the relief control valve automatically based on a closing motion of the recirculation control valve and simultaneously with the closing motion of the recirculation control valve; and
selectively relieving a pressure of exhaust in the third exhaust manifold.

14. The method of claim 13, wherein selectively relieving the pressure of exhaust in the first exhaust manifold includes directing exhaust from the first exhaust manifold to join exhaust from the second exhaust manifold entering a turbocharger.

15. The method of claim 13, further including directing exhaust from the second exhaust manifold through a turbocharger, wherein selectively relieving the pressure of exhaust in the first exhaust manifold includes directing exhaust from the first exhaust manifold to a location downstream of the turbocharger.

16. An engine, comprising:
an engine block at least partially defining a first cylinder, a second cylinder, a third cylinder, and a fourth cylinder;
a first intake manifold fluidly connected to the first and second cylinders;
a first exhaust manifold fluidly connected to the first and second cylinders;
a second intake manifold fluidly connected to the third and fourth cylinders;
a second exhaust manifold fluidly connected to the third and fourth cylinders;
a third exhaust manifold fluidly connected to the third cylinder;
a fourth exhaust manifold fluidly connected to the fourth cylinder, the fourth exhaust manifold being distinct from the third exhaust manifold;
a turbocharger fluidly connected to only the second exhaust manifold, such that all exhaust gas entering the turbocharger exited from the second exhaust manifold;

at least one recirculation passage extending from the first and second exhaust manifolds to the first and second intake manifolds;

a recirculation control valve disposed in the at least one recirculation passage;

a restricted orifice connecting the first exhaust manifold to the second exhaust manifold;

a pressure relief passage extending from the first exhaust manifold to at least one of the second exhaust manifold and a location downstream of the turbocharger;

a relief control valve disposed within the pressure relief passage and movable to selectively reduce a back pressure of the first exhaust manifold; and a controller in communication with the relief control valve and the recirculation control valve, the controller being configured to effect an opening motion of the relief control valve automatically based on a closing motion of the recirculation control valve and simultaneously with the closing motion of the recirculation control valve.

* * * * *